O. T. WAITE.
GRASS TWINE.
APPLICATION FILED JUNE 27, 1913.

1,144,163.

Patented June 22, 1915.

Witnesses
Harry S. Gaither
Wm. J. Lord

Inventor
Ossian T. Waite
by Banning & Banning
Attys.

UNITED STATES PATENT OFFICE.

OSSIAN T. WAITE, OF OSHKOSH, WISCONSIN.

GRASS TWINE.

1,144,163.  Specification of Letters Patent.  Patented June 22, 1915.

Application filed June 27, 1913. Serial No. 776,056.

*To all whom it may concern:*

Be it known that I, OSSIAN T. WAITE, a citizen of the United States, residing at Oshkosh, in the county of Winnebago and State of Wisconsin, have invented certain new and useful Improvements in Grass Twine, of which the following is a specification.

The present invention relates to the formation and construction of a grass twine used in the production of grass rugs, and to the process of weaving the rugs when the twine of the present invention is utilized; and relates further to the texture of the woven rug when formed of said twine.

The objects of the present invention are to enable the woof of the rug to be formed of a grass twine which is of relatively small diameter, thus resulting in an obvious reduction in the cost of manufacture due to the saving of material, and to so form this twine as to eliminate the danger of its breaking or separating during the weaving operation; to form and construct the twine so as to allow of the use of short lengths of grass and yet produce a rug which is commercially practical; and to allow the twine to be given a relatively sharp bend along the edge during the weaving operation, so that a firm selvage edge is maintained along the edges of the rug.

The invention further consists in the features of construction and combination of parts hereinafter described and claimed.

Figure 1:
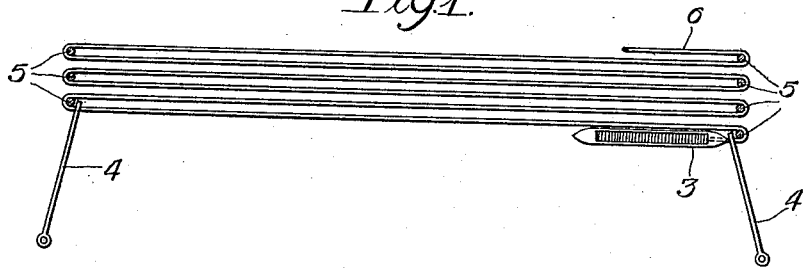

In the drawings: Figure 1 is a diagrammatic view illustrating the operation of weaving grass rugs; and Fig. 2 an enlarged sectional detail showing the manner in which the twine is acted upon during the weaving operation, and showing more clearly the construction of the twine.

According to the present practice of weaving so-called "grass rugs", it is customary to spin the woof twine out of a natural product which is commonly known as "wire grass". This so-called grass twine is not a true grass, but belongs rather to the group of sedges, but for purposes of convenience the term "grass", as used in this specification, will be understood to refer to such fibrous material having grass-like properties. This sedge as is well known has a smooth hard exterior and is not capable of adhering one to the other by reason of surface friction when placed in parallel condition. The woof twine is ordinarily formed to comprise a body portion consisting of overlapping lengths of straight-laid untwisted grass-like material loosely wound with a spiral wrapping thread, which wrapping thread affords the only binder for preventing disintegration of the twine. It is desirable to wrap the grass-like material somewhat loosely in order to afford a relatively soft twine for weaving purposes. This soft quality is desirable for several reasons. In the first place if the woof twine is soft, it permits the warp of the completed rug to be embedded into the woof, and thereby increases the wearing properties of the rug by protecting the warp threads against excessive wear to which they would be subjected if the woof were hard and firm. In the second place, by spinning the woof twine loosely, the bulk of the twine is relatively increased and the supply correspondingly conserved; and in the third place a relatively soft or loose woof twine affords a softer surface texture in the completed rug which is particularly desirable where the rugs are intended for use in bathrooms or bed-rooms, or other places where they are contacted by the bare feet of the occupants.

In order to secure a soft loose woof twine of the character indicated, however, it is necessary to sacrifice tensile strength to a corresponding degree, and this particularly is the case where the grass is laid straight or untwisted. Tensile strength is not required in the completed rug, but a certain amount of strength is necessary in order to utilize the twine in the loom upon which the rugs are woven, and the object of the present invention is to so form the twine and to so conduct the weaving operation as to conserve the twine against breakage during the weaving operation, and particularly to protect the twine against breakage due to the striking of the shuttle across the loom. By forming the twine in the manner to be hereinafter described, a smaller or less bulky twine can be utilized without sacrifice of the necessary amount of tensile strength required in the weaving operation, thereby conserving the supply of wire-grass or like material, and reducing the waste incident to breakage by the loom to a minimum. Furthermore, by utilizing the twine of this invention, the woof strand can be bent more sharply and tightly along the selvage edge, thereby eliminating the necessity of using a selvage-binding strip which is at present commonly employed in the manufacture of grass rugs.

Referring to the drawings, and particularly to Fig. 1, a shuttle 3 is illustrated, which is projected back and forth across the loom by means of striker arms 4 placed on opposite sides of the loom. This operation is well known to anybody versed in the art to which the present invention relates, and need not be described in detail. It is sufficient to state that the twine is looped during the weaving operation about pins 5.

Figure 2:
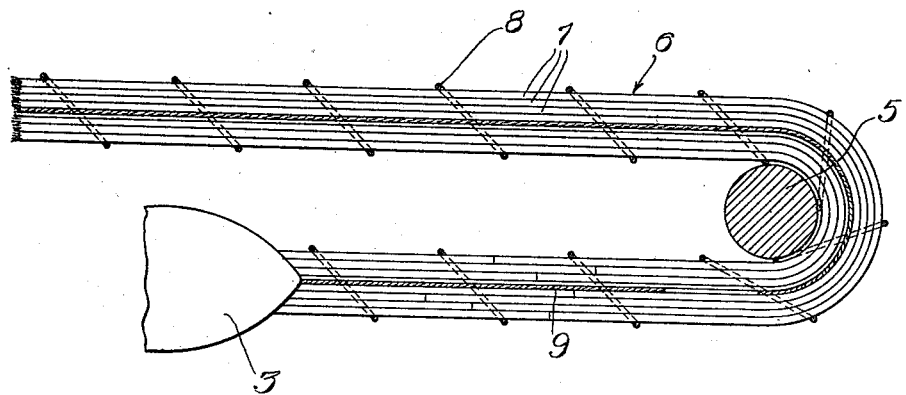

The twine of the present invention is illustrated more clearly in Fig. 2, and as there shown comprises a body 6 consisting of a series of parallel overlapping lengths of grass 7 which are loosely bound by a spiral wrapping cord 8. This wrapping cord or thread is placed on the twine loosely in order to give the soft property to the twine which is desirable for the reasons heretofore set forth.

Running approximately central of the body of the twine is an inextensible core thread 9. This core thread is of a tensile strength that will snap or give way when the shuttle is projected during the weaving operation; one kind of thread which I have selected as adapted for this purpose is a number 32 or 35 two ply cotton yarn, although the invention is not intended to be limited to the thread specifically named, and it is due entirely to the presence of this core thread that it is possible to make use of a cord of small diameter and produce a rug therefrom which will be practical for commercial purposes.

As heretofore stated, the shuttle is projected back and forth across the loom by the striker arms 4. Its speed of projection is relatively great and a substantial strain is placed on the twine at the time the shuttle is struck. If twine of small diameter were used, which is composed entirely of straight lengths of grass, it would not have a sufficient tensile strength to withstand the strain, due to the impact of the striker arms against the shuttle, with the result that the grass forming the body of the twine would either break or tear loose, and thus destroy both the appearance of the completed rug and its utility for any practical purposes. It is obvious that, if the twine so breaks or tears loose, the ragged ends of the grass will project above the surface of the rug, thereby making the same unsightly; and even if these were trimmed off, the rug would be weakened at these points of breakage, so that it would wear out in a comparatively short time. Thus, it has been found necessary heretofore to use a grass of substantially large diameter in order to enable the weaving operation to be carried out and produce a rug of practical use. In using a twine of large diameter, the amount of material necessary to form the rug is, of course, increased over the case where a twine of relatively small diameter is used; and, moreover, the twine of large diameter when bent about the pins 5 cannot be bent at any material sharp angle without cracking or breaking. Therefore, in weaving rugs from a twine of large diameter, a loosely woven edge is produced, which has to be reinforced by a selvage-binding strip.

By placing an inextensible cord or core thread within the body of the twine, such as the cord 9, this thread will take up all the strain due to the projection of the shuttle during the weaving operation. That is, when the shuttle is projected by the action of the striker arms, the force of this blow will be communicated practically entirely to the thread 9, owing to its inextensible character. This thread is of such tensile strength as to break under the force of the blow, and will snap under the strain imparted to the twine by the action of the shuttle. When this snapping takes place, the force of the blow, due to the projection of the shuttle, is practically spent, and thus, as the shuttle moves across the machine, the only strain imparted to the grass of the twine will be a slight one which will result in only a slight stretching of the same, and will not be of a nature severe enough to effect a breaking of the grasses comprising the twine, or a separation of the same. By the use of this inextensible thread, the grass is protected from undue strain due to the weaving operation, and it thus becomes possible to use a grass of relatively small diameter in producing the rug. By using twine of small diameter, a relatively sharp bend can be placed in the same during the weaving operation, thus making a closely woven edge and eliminating the necessity for using a separate binding strip in making the completed rug.

I claim:

1. As a new article of manufacture, a twine for weaving purposes, comprising a body filler consisting of over-lapping lengths of smooth surfaced grass-like material, a spiral winding thread therefor laid under sufficiently light tension to permit stretching of the body filler, and a center core thread of inextensible character adapted to break when the twine is subjected to a stretching strain, whereby the shock of the strain is absorbed and breaking of the grasses eliminated, substantially as described.

2. As a new article of manufacture, a twine for weaving purposes, comprising a body filler consisting of over-lapping lengths of sedge, a spiral winding thread therefor laid under sufficiently light tension to permit stretching of the twine and longitudinal displacement of the straight-laid lengths of grass-like material, and a center core thread of inextensible character adapted to break when the twine is subjected to a stretching strain, whereby the shock of such strain is absorbed and a breaking of the twine eliminated, substantially as described.

3. The process of weaving grass rugs, which consists in loading the shuttle of a loom with a supply of twine composed of overlapping lengths of smooth surfaced grass-like material, loosely bound with a spiral wrapping thread in a manner to permit stretching of the twine and an inextensible core thread, then striking the shuttle across the loom with sufficient force to break the core thread and thus relieve the grasses from excessive strain and permit a moderate extension of the same, substantially as described.

4. The process of weaving grass rugs which consists in loading the shuttle of a loom with a supply of twine composed of overlapping lengths of sedge loosely bound with a spiral wrapping thread in a manner to permit stretching of the twine and further provided with an inextensible core thread then striking the shuttle across the loom with sufficient force to break the core thread whereby the grasses are relieved from excessive strain during the weaving operation and a moderate expansion of the twine permitted, substantially as described.

OSSIAN T. WAITE.

Witnesses:
D. L. RODERICK,
GEO. J. MEYER.

Copies of this patent may be obtained for five cents each, by addressing the "Commissioner of Patents, Washington, D. C."